US009909634B2

(12) United States Patent
Brandl et al.

(10) Patent No.: US 9,909,634 B2
(45) Date of Patent: Mar. 6, 2018

(54) BRAKE PAD MOUNTING FOR A DISC BRAKE FOR A COMMERCIAL VEHICLE

(71) Applicant: KNORR-BREMSE Systeme fuer Nutzfahrzeuge GmbH, Munich (DE)

(72) Inventors: Christian Brandl, Plattling (DE); Michael Hidringer, Hofkirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/993,150

(22) Filed: Jan. 12, 2016

(65) Prior Publication Data
US 2016/0123415 A1 May 5, 2016

Related U.S. Application Data

(63) Continuation of application No. PCT/EP2014/064498, filed on Jul. 8, 2014.

(30) Foreign Application Priority Data

Jul. 12, 2013 (DE) .................. 10 2013 011 655

(51) Int. Cl.
*F16D 55/00* (2006.01)
*F16D 65/097* (2006.01)
(Continued)

(52) U.S. Cl.
CPC ....... *F16D 65/0977* (2013.01); *F16D 55/224* (2013.01); *F16D 55/225* (2013.01);
(Continued)

(58) Field of Classification Search
CPC .. F16D 55/224; F16D 55/225; F16D 55/2265; F16D 65/092; F16D 65/0977;
(Continued)

(56) References Cited

U.S. PATENT DOCUMENTS 2,296,470 A * 9/1942 Keehn ................. F16B 29/00
411/53
3,271,058 A * 9/1966 Anderson ............... F16B 5/02
403/408.1
(Continued)

FOREIGN PATENT DOCUMENTS

DE 23 63 427 A1 6/1975
DE 296 20 841 U1 4/1998
(Continued)

OTHER PUBLICATIONS

International Search Report (PCT/ISA/210) issued in PCT Application No. PCT/EP2014/064498 dated Sep. 30, 2014, with English translation (four (4) pages).
(Continued)

*Primary Examiner* — Thomas W Irvin
(74) *Attorney, Agent, or Firm* — Crowell & Moring LLP

(57) ABSTRACT

A brake pad mounting is provided for a disc brake for a commercial vehicle, having a pad mounting bracket which is supported on pad holding springs of brake pads which are arranged in a brake caliper on both sides of a brake disc. The pad mounting bracket spans a mounting opening of the brake caliper in the axial direction of the brake disc and is held in a fastening socket of the brake caliper at least on one side by way of a securing bolt, is configured in such a way that the securing bolt consists of two individual parts which are connected to one another in a positively locking and/or nonpositive and/or integrally joined manner and, on the end side, have in each case one head which can bear against an associated side surface of the pad mounting bracket.

2 Claims, 4 Drawing Sheets

(51) Int. Cl.
*F16D 55/224* (2006.01)
*F16D 55/225* (2006.01)
*F16D 65/092* (2006.01)
*F16D 65/00* (2006.01)

(52) U.S. Cl.
CPC ....... *F16D 65/0006* (2013.01); *F16D 65/092* (2013.01); *F16D 65/0978* (2013.01); *F16D 2055/007* (2013.01); *F16D 2250/0084* (2013.01)

(58) Field of Classification Search
CPC ............ F16D 65/0978; F16D 65/0006; F16D 2250/0084; F16D 2055/007; F16B 37/145; F16B 39/282; F16B 37/122; F16B 33/002
USPC ........... 188/73.1, 73.31, 73.32, 73.36, 73.37, 188/73.44; 411/44, 45, 60.2, 60.1
See application file for complete search history.

(56) References Cited

U.S. PATENT DOCUMENTS

| | | | | |
|---|---|---|---|---|
| 3,414,304 A * | 12/1968 | Miller | ..................... | F16B 29/00 403/408.1 |
| 3,462,114 A | 8/1969 | O'Dell, Sr. et al. | | |
| 3,835,525 A * | 9/1974 | King, Jr. | ................. | B23P 9/025 29/412 |
| 4,033,243 A * | 7/1977 | Kirrish | ................. | F16B 37/145 411/338 |
| 4,310,273 A * | 1/1982 | Kirrish | ................. | F16B 5/0233 411/338 |
| 4,490,083 A * | 12/1984 | Rebish | ...................... | F16B 5/02 411/338 |
| 4,740,124 A * | 4/1988 | Pearson | .................. | F16B 39/22 411/339 |
| 5,290,131 A * | 3/1994 | Henriksen | ............. | F16B 37/145 411/180 |
| 5,568,845 A * | 10/1996 | Baumgartner | ........ | F16D 55/227 188/196 D |
| 5,891,115 A * | 4/1999 | Hauer | .................... | A63C 17/22 301/111.01 |
| 8,662,261 B2 * | 3/2014 | Raffin | ................. | F16D 65/0978 188/1.11 W |
| 9,267,531 B2 * | 2/2016 | Revel | ...................... | F16B 39/02 |
| 9,382,958 B2 * | 7/2016 | Camilo-Martinez | . | F16D 65/183 |
| 2004/0120789 A1* | 6/2004 | Masuda | ................. | F16B 37/122 411/178 |
| 2008/0257657 A1* | 10/2008 | Siebke | .................... | F16D 55/22 188/1.11 L |
| 2012/0219377 A1* | 8/2012 | Pamer | ................... | F16B 39/282 411/188 |
| 2013/0108392 A1 | 5/2013 | Henriksen, Jr. | | |
| 2013/0243544 A1* | 9/2013 | Delcher | ................ | F16B 39/282 411/154 |

FOREIGN PATENT DOCUMENTS

| | | |
|---|---|---|
| DE | 94 22 342 U1 | 4/2000 |
| DE | 10 2007 004 012 A1 | 7/2008 |
| DE | 10 2008 013 017 A1 | 3/2009 |
| DE | 10 2008 027 052 A1 | 12/2009 |
| EP | 1 980 768 A2 | 10/2008 |
| EP | 1 982 852 A1 | 10/2008 |

OTHER PUBLICATIONS

German Office Action issued in counterpart German Application No. 10 2013 011 655.4 dated Feb. 20, 2014 (seven (7) pages).
International Preliminary Report on Patentability (PCT/IB/338 & PCT/IB/373) and Written Opinion (PCT/ISA/237) issued in PCT Application No. PCT/EP2014/064498 dated Jan. 21, 2016, including English translation (ten (10) pages).

* cited by examiner

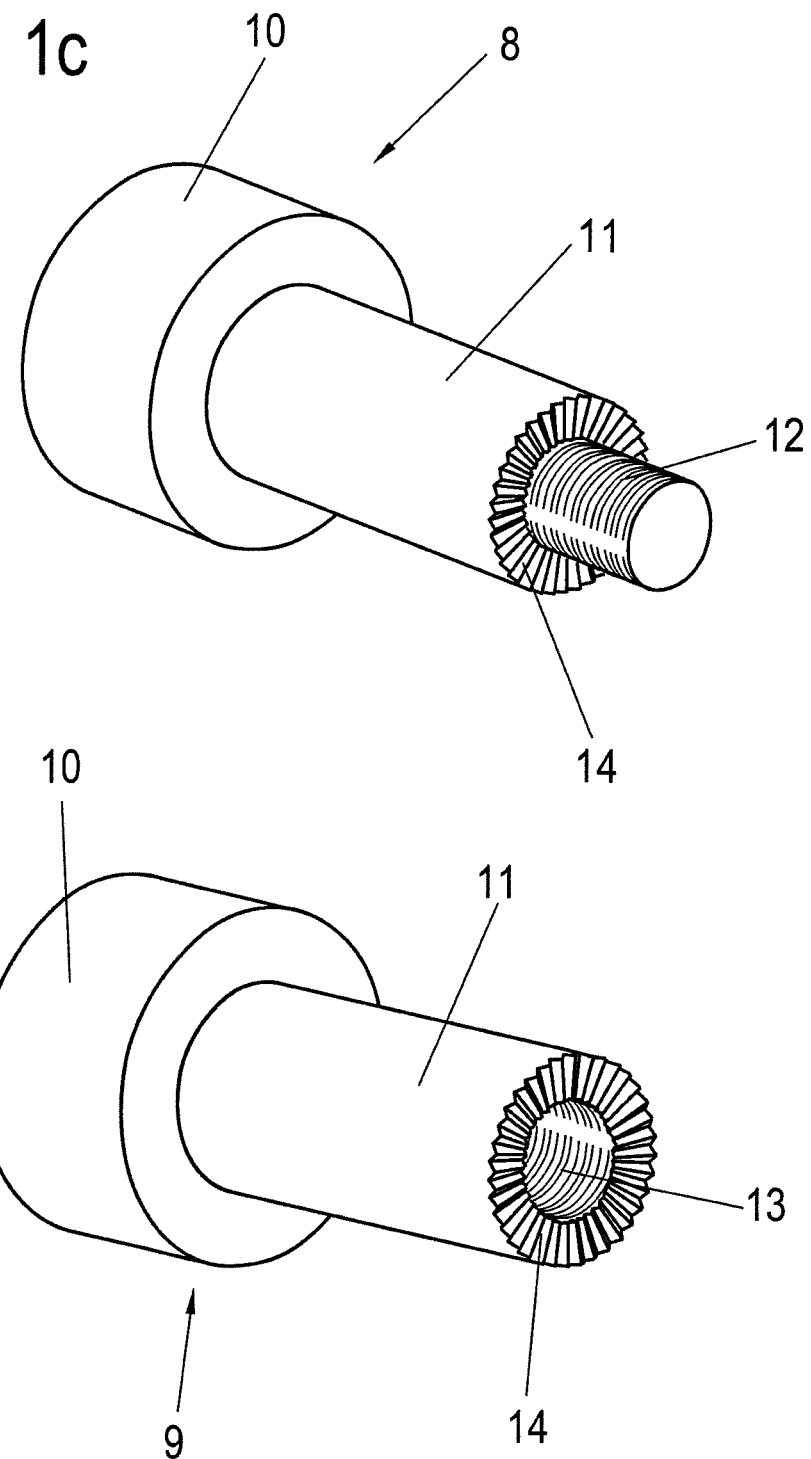

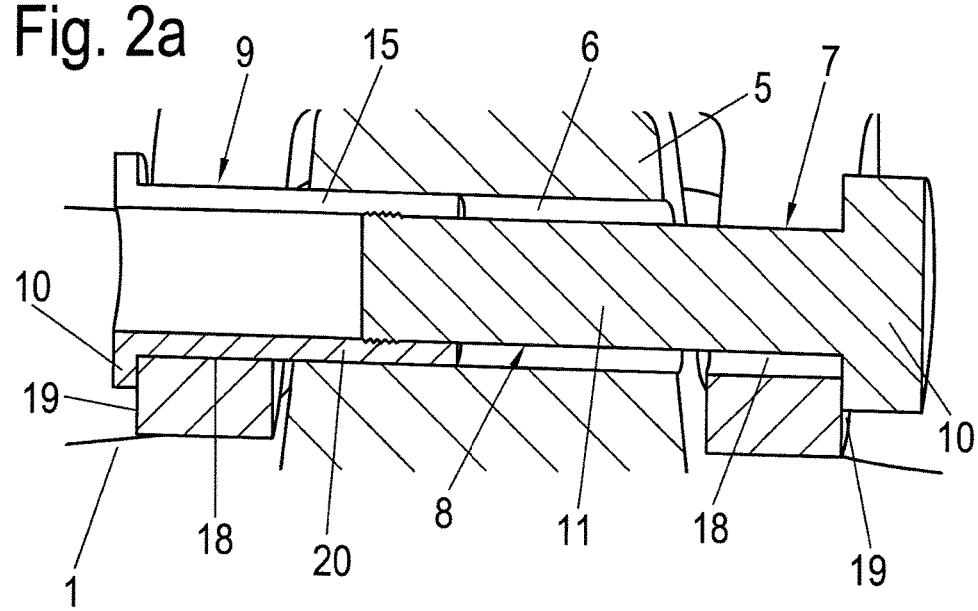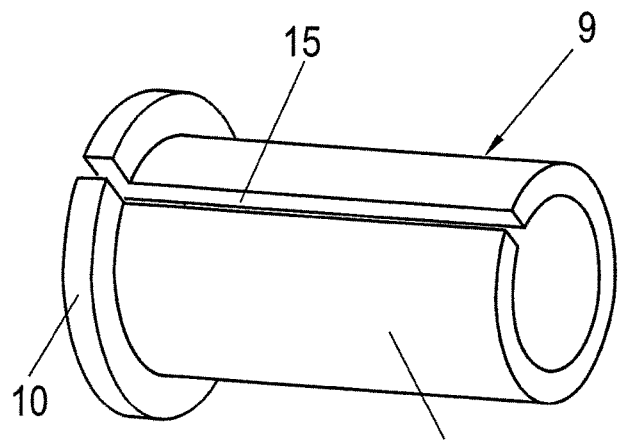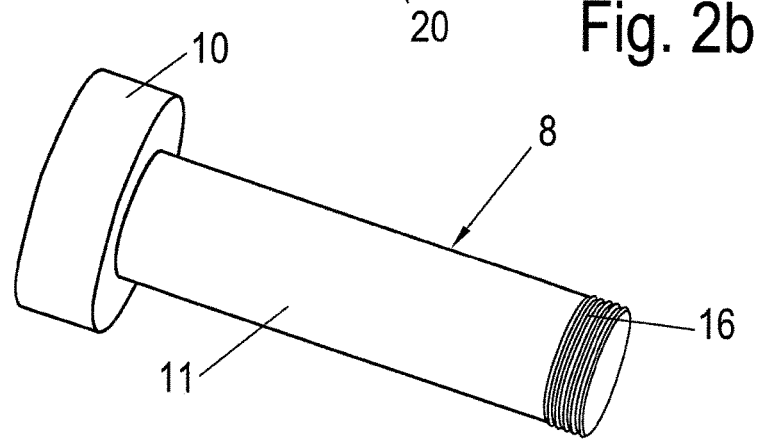

BRAKE PAD MOUNTING FOR A DISC BRAKE FOR A COMMERCIAL VEHICLE

CROSS REFERENCE TO RELATED APPLICATIONS

This application is a continuation of PCT International Application No. PCT/EP2014/064498, filed Jul. 8, 2014, which claims priority under 35 U.S.C. § 119 from German Patent Application No. 10 2013 011 655.4, filed Jul. 12, 2013, the entire disclosures of which are herein expressly incorporated by reference.

BACKGROUND AND SUMMARY OF THE INVENTION

The invention relates to a brake pad mounting of a disc brake for a commercial vehicle, having a pad mounting bracket which is supported on pad mounting springs of brake pads which are arranged on both sides of a brake disc in a brake caliper, the pad mounting bracket bridging an assembly opening of the brake caliper in the axial direction of the brake disc and being held in a fastening socket of the brake caliper at least on one side by means of a securing bolt.

DE 94 22 342 U1 discloses a brake pad mounting which has proven itself, in particular, even under the often rough operating conditions, to which disc brakes are subjected in commercial vehicles.

In order to secure the position of the two brake pads, the latter are provided in each case with a pad mounting spring, which pad mounting springs are fastened to the respective brake pad in the upper edge region which faces an assembly opening of the brake caliper.

The brake pads are pressed under prestress into the pad shaft of a stationary brake carrier or the brake caliper by a pad mounting bracket which extends transversely with respect thereto, that is to say in the axial direction of the brake disc, and is supported on the pad mounting springs. Here, the pad mounting bracket is fixed in two regions of the brake caliper which lie opposite one another and delimit the assembly opening.

The mounting of the brake pads under spring prestress serves both for tolerance compensation and also for reducing or preventing the generation of rattling noise, as would otherwise occur during driving operation of the vehicle.

In order to assemble and dismantle the pad mounting bracket using simple measures, it is plugged on one side into a pocket-shaped receptacle of the brake caliper and is fastened on the other side to the brake caliper by way of a securing bolt, a washer and a split pin. The securing bolt which is supported on the pad mounting bracket is guided by way of a fastening socket which is formed integrally on the brake caliper and passes through a window opening of the pad mounting bracket.

The multiplicity of necessary individual parts, by way of which the pad mounting bracket is fastened to the brake caliper, is possible only with relatively great outlay on manufacturing and assembly, which leads to correspondingly high costs and opposes the constant requirement for cost optimization.

This likewise applies to another known way of fastening the pad mounting bracket, in which the latter is screwed to the brake caliper. To this end, a threaded bore has to be made in the brake caliper, which can naturally be brought about only in a relatively complicated manner.

Moreover, there is in principle the risk that the fastening element, specifically the split pin, becomes detached and is lost, in particular, during driving operation, just like the securing bolt which is then no longer secured, with the result that the pad mounting bracket can no longer fulfill its function, with the consequence of a failure of the disc brake.

The invention is based on the object of developing a brake pad mounting of the generic type in such a way that it can be manufactured and assembled in a more simple and less expensive manner.

This object is achieved by way of a brake pad mounting of a disc brake for a commercial vehicle, having a pad mounting bracket which is supported on pad mounting springs of brake pads which are arranged on both sides of a brake disc in a brake caliper, the pad mounting bracket bridging an assembly opening of the brake caliper in the axial direction of the brake disc and being held in a fastening socket of the brake caliper at least on one side by way of a securing bolt. The securing bolt has of two individual parts which are connected to one another in a positively locking and/or non-positive and/or integrally joined manner and, on the end side, have in each case one head which can bear against an associated side face of the pad mounting bracket.

As a result of this structural configuration of the securing bolt, the use of further measures, in particular a split pin, can in principle be dispensed with, since the double-sided securing against displacement is then taken over by heads which are formed integrally at both ends.

This results in a whole series of advantages. In particular, the assembly of the pad mounting bracket and its securing are simplified substantially and therefore become less expensive.

In addition to the simpler assembly, in which merely the two individual parts have to be connected to one another, the inexpensive manufacture which is now possible is to be emphasized, in particular since the individual parts can be manufactured as cold extruded parts, onto which optionally positively locking devices which engage merely into one another are formed integrally.

According to one advantageous development of the securing bolt according to the invention, an individual part is configured as an expanding sleeve, into which the second individual part, equipped with a pin, is driven.

By way of complete or partial profiling of the inner face of the expanding sleeve and/or of the pin, preferably by way of circumferential grooves, a positively locking and/or non-positive connection is generated, by way of which all individual parts are held securely in the axial direction with respect to one another.

It is also contemplated in principle to provide the expanding sleeve with an internal thread and the pin with an external thread, with the result that both individual parts can be screwed to one another.

In this case, the thread pitch of the internal thread is in accordance with that of the external thread, whereas the internal diameter of the internal thread is smaller than that of the external thread.

The external diameter of the expanding sleeve which has a continuous slot for expanding purposes is smaller than the inside diameter of the transverse bore of the fastening socket, with the result that, during assembly, the expanding sleeve can be pushed without problems into the transverse bore and, after the pin is struck or screwed in, the circumferential face of the expanding sleeve subsequently bears against the wall of the transverse bore in such a way that a frictional connection is produced for reliably holding the securing bolt overall.

A further design variant of the invention provides that one of the two individual parts has a threaded shank on the end side, which threaded shank can be screwed into a female thread of the other individual part, the thread-free regions having an identical external diameter which can correspond substantially to the inside diameter of the transverse bore.

In order to secure both individual parts against rotation, that is to say in order to prevent release of the screwed connection, toothing systems are provided on those end sides of the two individual parts which bear against one another, which toothing systems, after they have been screwed into the end position, engage into one another in a positively locking manner. Here, said toothing systems are provided as spare toothing systems with radially oriented teeth.

Slightly greater assembly complexity is required, in order to connect the two individual parts according to the invention in an integrally joined manner, that is to say by way of adhesive bonding, a combination of the different stated closure types also being contemplated.

Overall, the invention achieves improved functional reliability of the disc brake, since the securing bolt is connected to the brake caliper in a manner which is practically non-releasable and therefore captive.

Even in the case of enduringly more pronounced operation-induced vibrations of the commercial vehicle, a release of the securing bolt and therefore a release of the pad mounting bracket from its fastening position are ruled out.

Since a disc brake is a safety-relevant component, the improvement in the operational reliability is given particular significance.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
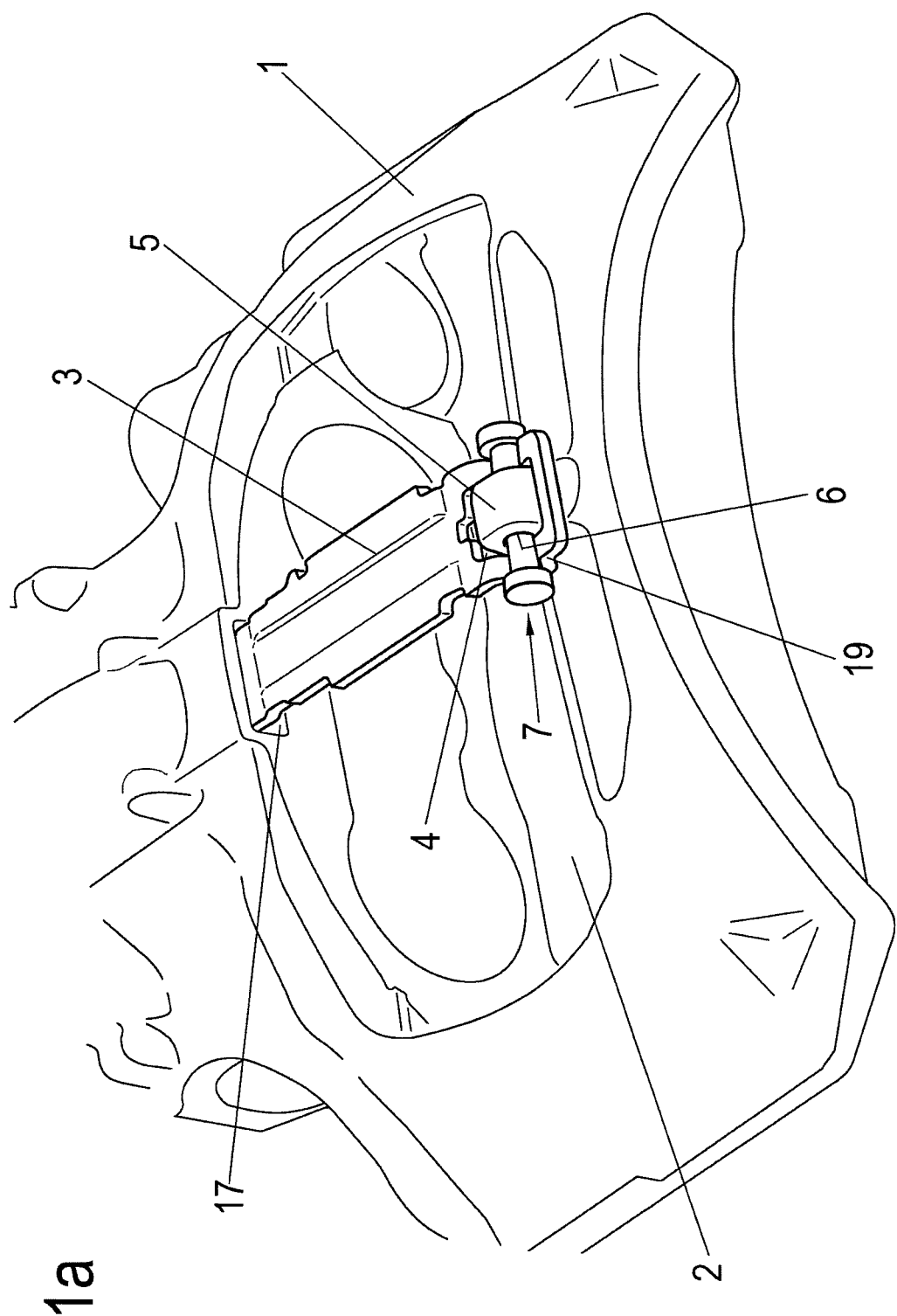
FIGS. 1a) to 1c) show one exemplary embodiment of the invention in different views, and FIGS. 2a) and 2b) show a further exemplary embodiment of the invention in different views.

FIGS. 1a) and 1b) show part of a disc brake for a commercial vehicle, having a brake caliper 1, in which two brake pads can be positioned which are assigned on both sides of a brake disc and are not shown, however, just like the brake disc.

Both brake pads are held in each case in a spring-loaded manner by way of a pad mounting spring in a pad shaft of a stationary brake carrier or in the brake caliper 1.

Here, the respective pad mounting spring extends transversely with respect to the axial direction of the brake disc and is fastened to the brake pad such that it can be deflected radially.

The pad mounting springs are set under prestress by way of a pad mounting bracket 3 which extends in the axial direction of the brake disc, bridges an assembly opening 2 of the brake caliper 1, and is supported on said pad mounting springs, with the result that the brake pads are pressed against the bottom of the pad shaft.

The pad mounting bracket 3 is plugged with one end into a formed pocket 17 of the brake caliper 1, whereas the other end is held on an integrally formed fastening socket 5 of the brake caliper 1 by way of a securing bolt 7. The fastening socket 5 passes through a window cutout 4 of the pad mounting bracket 3.

The securing bolt 7 is plugged in a transverse bore 6 of the fastening socket 5 and lies in a bead 18 of the pad mounting bracket 3 on the upper side which faces away from the brake caliper 1.

Figure 1B:
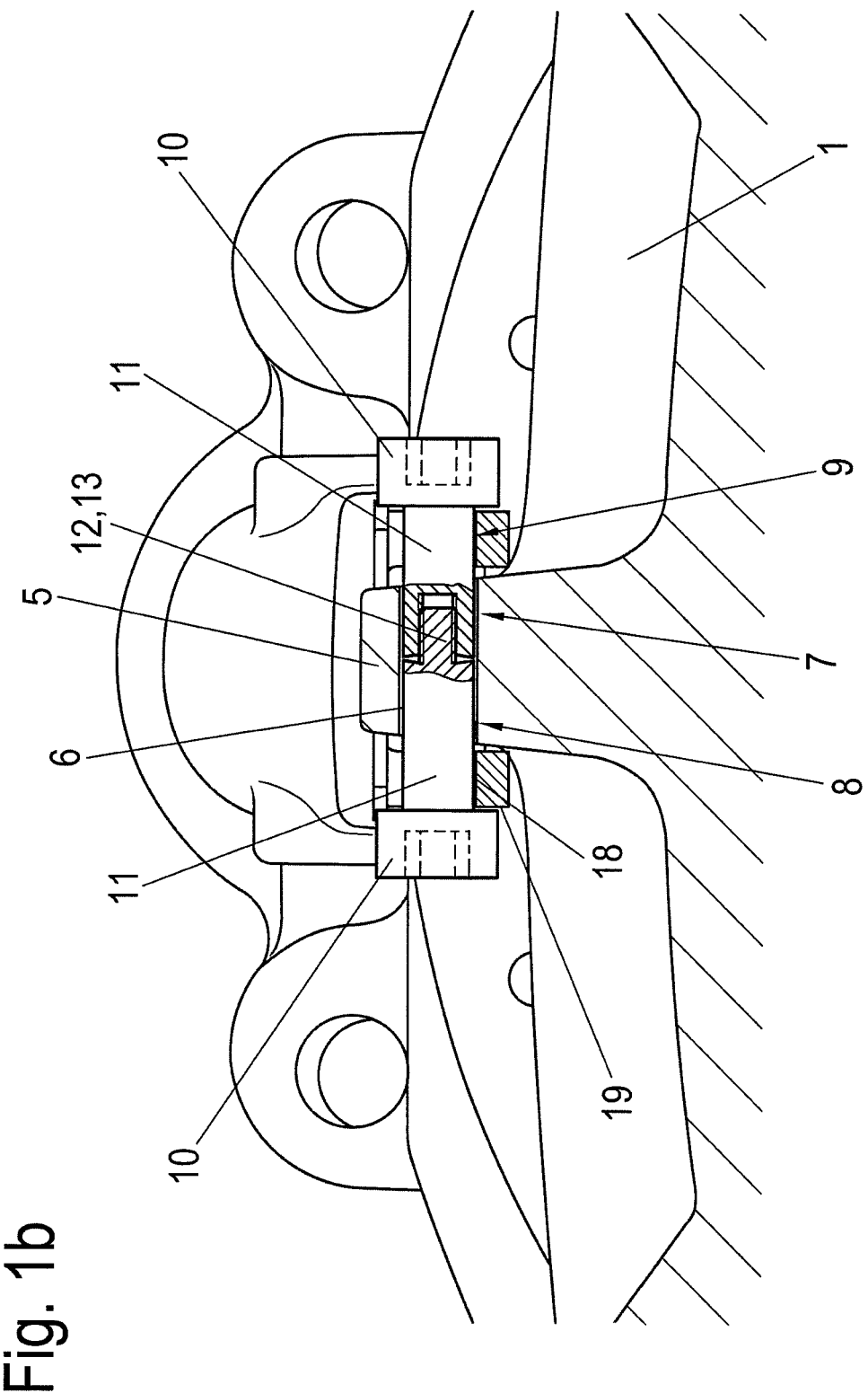

The securing bolt 7 according to one design variant is shown as a detail in FIG. 1c), whereas FIG. 1a) shows the securing bolt 7 in an assembled perspective illustration, and FIG. 1b) shows it in a sectioned view.

According to an embodiment of the invention, the securing bolt 7 consists of two individual parts 8, 9 which have an integrally formed head 10 at their respective one end, which head 10 bears against an associated side face 19 of the pad mounting bracket 3.

As illustrated, in particular, by FIG. 1c), the first individual part 8 has a threaded shank 12 at its end which lies opposite the head 10, which threaded shank 12 is screwed into an internal thread 13 of the second individual part 9. Here, the diameter of the threaded shank 12 is smaller than that of a shank 11, onto which the threaded shank 12 is formed integrally and which carries the head 10 at its other end.

As can be seen, both shanks 11 of the individual parts 8, 9 have the same diameter.

The mutually facing end sides of the respective shank 11 are provided with a spur toothing system 14, the teeth of which run radially, and which spur toothing systems 14 engage into one another after the two individual parts 8, 9 are screwed to one another, with the result that an anti-rotation safeguard exists.

FIGS. 2a) and 2b) show a further variant of the invention, in which the two individual parts 8, 9 consist of a pin 11 and an expanding sleeve 20 which, on the end side, in each case have a head 10 which bears against the associated side face 19 of the pad mounting bracket 3.

As is illustrated very clearly, in particular, by FIG. 2b), the expanding sleeve 20 has a continuous slot 15 which makes radial expansion possible.

To this end, in the non-assembled position, the inside diameter of the expanding sleeve 20 is slightly smaller than the shank 11 of the first individual part 8, a profiling 16, in the form of a plurality of circumferential grooves, being formed integrally on that end region of the shank 11 which lies opposite the head 10.

In order to assemble the securing bolt 7, first of all the expanding sleeve 20 is plugged into the transverse bore 6. Afterward, the first individual part 8 is struck into the expanding sleeve 20, which is resisted by the latter, said expanding sleeve 20 expanding radially and being pressed against the reveal of the transverse bore 6.

By way of the profiling 16, a positively locking connection is achieved with the inner wall of the expanding sleeve 20, by way of which positively locking connection the connection of both individual parts 8, 9 is secured.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pad mount of a disc brake for a commercial vehicle, comprising:

a pad mounting bracket supportable on pad mounting springs of brake pads arranged on both sides of a brake disc in a brake caliper of the disc brake, the pad mounting bracket bridging an assembly opening of the brake caliper in an axial direction of the brake disc and being held in a fastening socket of the caliper at least on one side via a securing bolt, wherein the securing bolt comprises two individual parts connected to one another in a positively locking, non-positively locking and/or integrally joined manner, on each end side of the securing bolt, a head is arranged that bears against an associated side face of the pad mounting bracket, wherein at an end lying opposite the head, the shank of the first individual part has a threaded shank whose diameter is less than a diameter of the shank, and the threaded shank is screwed into an internal thread of a shank of the second individual part, wherein the shanks of the first and second individual parts have identical diameters, and a spur toothing system is provided on end sides of the shanks which lay against one another, the spur toothing system having radially extending teeth which engage in a positively locking manner into one another in a screwed-in position.

2. The brake pad mounting according to claim 1, wherein the first individual part is adhesively bonded to the second individual part.

\* \* \* \* \*